W. C. MEADOR.
INDICATOR.
APPLICATION FILED DEC. 19, 1916.
1,346,758.
Patented July 13, 1920.
3 SHEETS—SHEET 1.
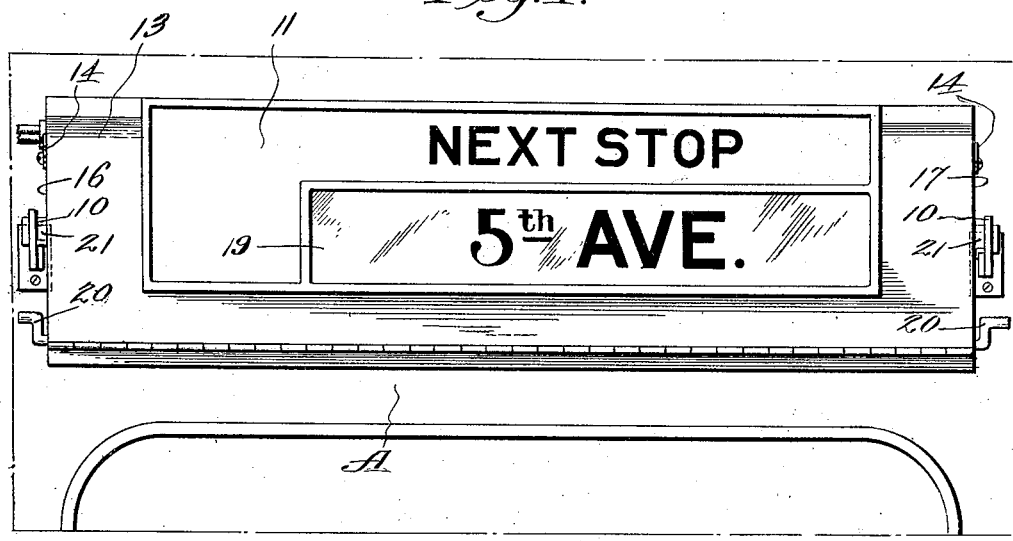
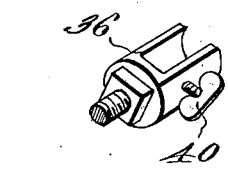
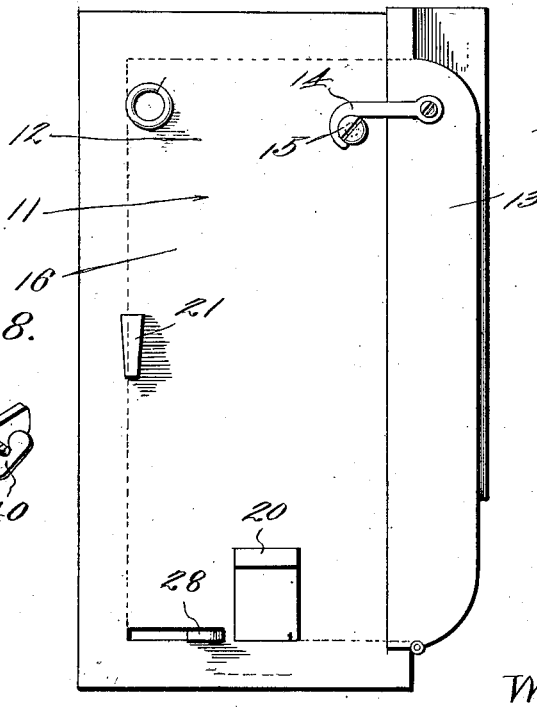
WITNESSES
INVENTOR
W. C. Meador
BY Victor J. Evans
ATTORNEY

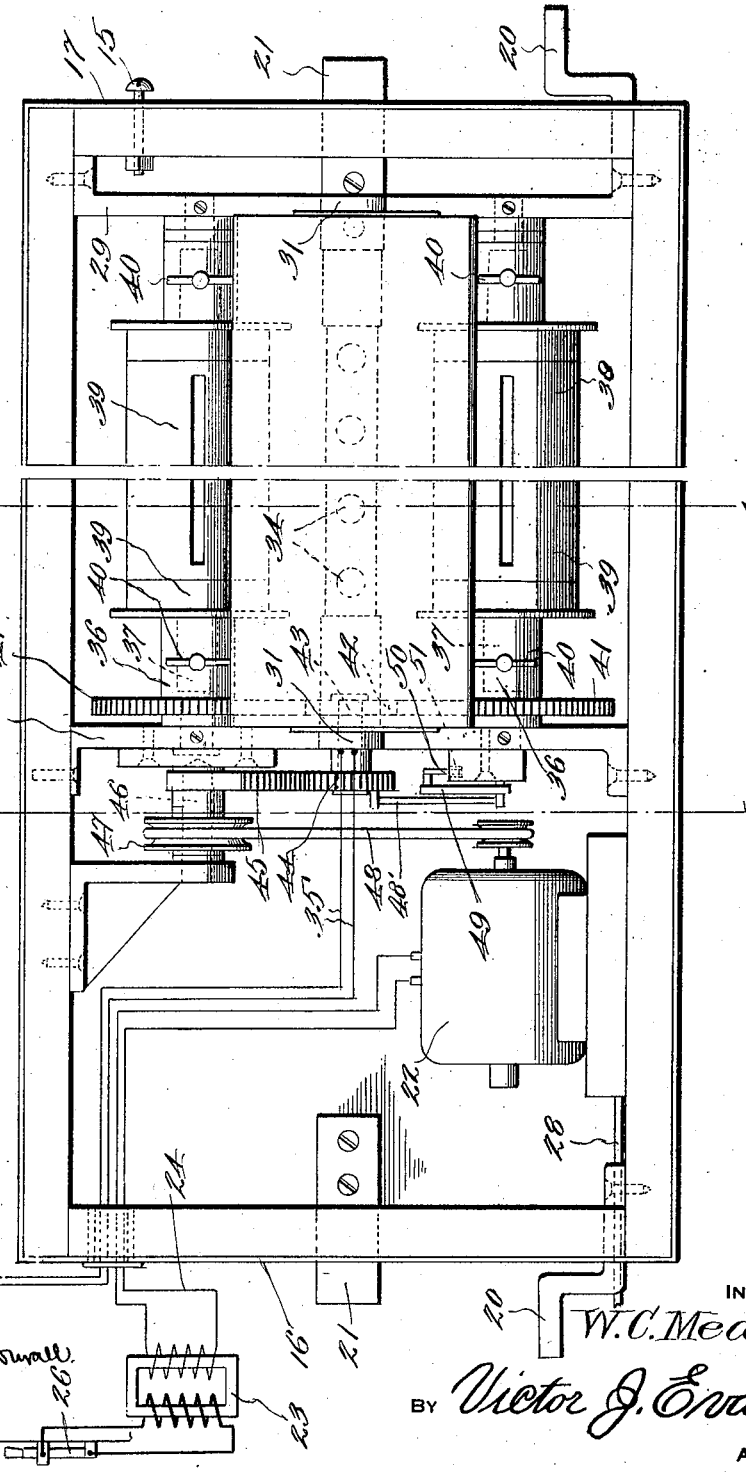

W. C. MEADOR.
INDICATOR.
APPLICATION FILED DEC. 19, 1916.

1,346,758.

Patented July 13, 1920.
3 SHEETS—SHEET 3.

WITNESSES
M. Max. Durall
F. Hough

INVENTOR
W. C. Meador,
BY Victor J. Evans
ATTORNEY

UNITED STATES PATENT OFFICE.

WILLIAM C. MEADOR, OF CHATTANOOGA, TENNESSEE, ASSIGNOR OF ONE-HALF TO EMMETT H. ROLSTON, OF CHATTANOOGA, TENNESSEE.

INDICATOR.

1,346,758.  Specification of Letters Patent.  Patented July 13, 1920.

Application filed December 19, 1916. Serial No. 137,854.

*To all whom it may concern:*

Be it known that I, WILLIAM C. MEADOR, a citizen of the United States, residing at Chattanooga, in the county of Hamilton and State of Tennessee, have invented new and useful Improvements in Indicators, of which the following is a specification.

This invention relates to an indicator and more particularly to an indicator which is especially adapted for use upon street cars, and other passenger carrying vehicles.

The primary object of the invention is to provide an indicator which is portable and may be operated by the person in charge of the vehicle to indicate to the passengers thereon the next stop which the vehicle will make.

Another object of the invention is to provide an indicator having electrically operated indicating mechanism which is simple in construction and durable in use.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications, within the scope of the claims may be resorted to when desired.

In the drawings:

Figure 1 is a view in elevation of an indicator constructed in accordance with the invention, and showing the same connected with a support.

Fig. 2 is a view similar to Fig. 1, the front of the indicator being removed and the electrical circuit for supplying power to the operating mechanism shown diagrammatically.

Fig. 3 is an end view of the indicator.

Fig. 8 is a detailed perspective view of one of the bearings in which are received the spindles on the winding spools.

Like characters of reference denote corresponding parts throughout the several views in the drawings.

Figure 4:
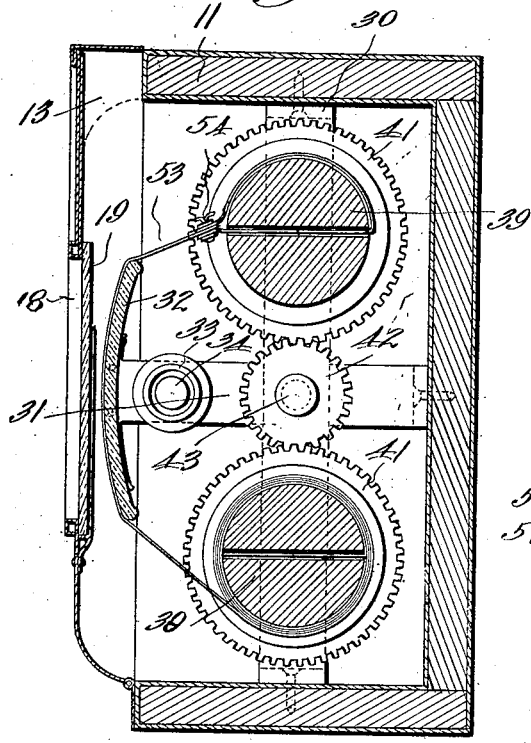
Fig. 4 is a vertical transverse section on the line 4—4 of Fig. 2.
Figure 5:
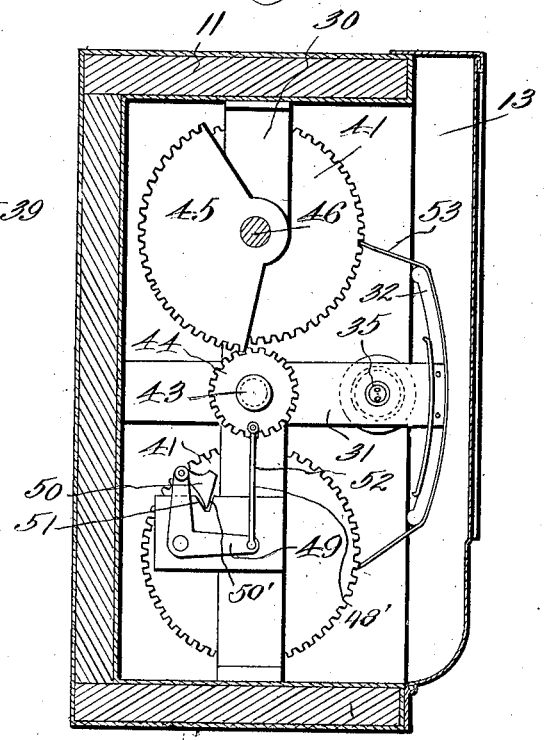
Fig. 5 is a similar section on the line 5—5 of Fig. 2.
Figure 6:
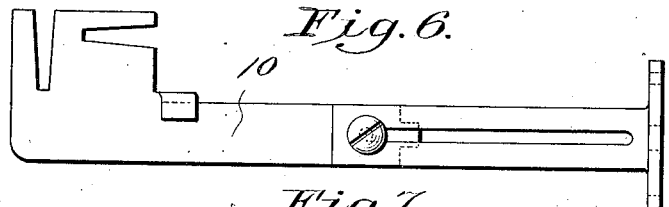
Fig. 6 is a view in side elevation of one of the supporting brackets for the indicator.
Figure 7:
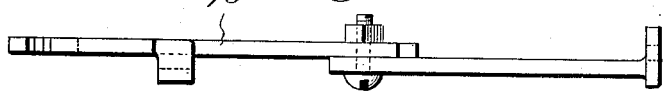
Fig. 7 is a top plan view of the bracket.

Referring now to the drawings in detail, the letter A designates an end of a street car having a door therein above which is mounted a pair of adjustable and slotted brackets 10 receiving therebetween and supporting the improved indicator 11.

The indicator 11 includes a casing 12 which may be formed from any suitable material and is provided with a hinged front 13 normally held in closed position by hooks 14 engageable with keepers 15 on the end walls 16 and 17 of the casing, said front wall having formed therein an elongated and longitudinally extending opening 18 closed by a transparent panel 19.

Each end wall of the casing has secured thereto a handle 20 above which is arranged the lug 21 engageable with the brackets 10 and by means of which the indicator is supported thereon.

At one end of the casing 12 is a motor 22 and a transformer 23 included in an electrical circuit 24 provided with a normally open switch 26 which when closed enables the motor to be operated by the current supplied thereto through the circuit from a source of electrical energy not shown. The motor 22 is provided with a reversing switch 28 which extends exteriorly of the casing through a slot in the end wall 16.

Arranged within the casing 12 and secured to the walls thereof in any suitable manner are a pair of spaced supports 29 and 30 having extending laterally therefrom between their ends arms 31 with which is connected a curved and transparent guide plate 32 arranged in the rear of the transparent panel 19 and co-extensive in length therewith, said arms being provided with lamp sockets 33 in the rear of the guide plate receiving therein the ends of an incandescent lamp 34 which may be detachably connected with a suitable source of electrical energy (not shown in the drawings) through the medium of a plug 35, the wires 35' connected therewith pass exteriorly of the casing through an insulating member in the end wall of the casing, said insulating member also having passed therethrough the wires included in the circuit 24.

Each of the supports 29 and 30 has connected therewith a pair of bearings 36 arranged above and below the arm 31, said bearings receiving therein the spindles 37 on a pair of slotted and flanged winding spools 38 and 39 interposed between the supports 29 and 30. The bearings 36 which are free to turn in the supports 30 are provided with spindle retaining members 40.

The bearings 36 on the support 30 have keyed thereto toothed wheels 41 meshing with a pinion 42 arranged therebetween and fixed to a stub shaft 43 mounted to turn in the support 30 and extending beyond the same to support a second pinion 44 to be engaged by a segment 45 fixed to a shaft 46 suitably supported for turning movement above the pinion 44, said shaft 46 having mounted thereon a pulley 47 connected by a belt 48 with the drive shaft of the motor 22, so that when the circuit 24 has been closed by means of the switch 26, the shaft 46 will be rotated by the motor 22 until the circuit is again broken and which after complete revolution of the shaft 46, the pinion 44 will be revolved once.

A link 48', is pivoted to the pinion 44 and to one arm of the bell crank lever 49, which is mounted to rock on the support 30, said lever having pivotally connected with its other arm a dog 50, the nose 50' of which is moved into a recess 51 in the support 30 by the link 48', as the teeth on the segment leave the teeth on the pinion 44. Thus the movement of the pinion 44 and its attached parts due to momentum will be stopped due to the weight of the bell crank lever and the dog. In this manner the pinion will be held stationary until it is again engaged by the segment.

A tape 53 formed from some suitable translucent material and adapted to pass over the guide plate 32 has its terminals provided with attaching members 54, by means of which the tape is connected with the winding spools 38 and 39, said tape having printed thereon at spaced intervals throughout its length suitable indicia indicating the stations at which the vehicle will stop and when the vehicle is at its starting point the tape is wound upon the spool 38 as shown in Fig. 4 in the drawings.

Through the above described manner of connecting the tape 53 with the winding spools, it will be seen that when the switch 26 is closed to energize the motor 22, the segment 45 will be turned into engagement with the pinion 44 which will operate the link 48' to release the nose of the dog 50 from the notch 51, such turning movement of the pinion 44 causing the pinion 42 through its engagement with the gear wheels 41 to simultaneously revolve the winding spools 38 and 39 to cause the name on the tape 53 adjacent the panel 19 and indicating the next station at which the vehicle will stop, to be moved upwardly one step and exposed to view through the panel 19, as the tape is unwound from the spool 38 and wound on the spool 39.

As each name, or indicating character, on the tape 53 is exposed to view through the opening 18, the switch 26 is opened and the motor stopped and as the nose of the dog 50 has again been inserted within the notch 51 by the link 52, further movement of the winding spools is prevented until the switch 26 is again closed.

When the tape has been wound on the spool 39 step by step as above described, and it is desired to again rewind the same on the spool 38, the switch 28 connected with the motor is operated to reverse the current after which the switch 26 is closed and held in such position until the tape has been rewound on the spool 38.

When the tape has been rewound upon the spool 38 by opening and closing the switch 26, the tape may be again wound step by step upon the spool 39 as the car travels on its route. The web 53 is made of ordinary tracing cloth and the variation in the sides of the diameters of the rows of webs on the spools amounts to about $\frac{3}{8}$ of an inch for a roll of one hundred stops. By using the tracing cloth there will be no danger of tearing and the change in the location of the names as they appear in the opening will amount to about $\frac{3}{8}$ of an inch so that by making said opening a little larger than the said means will always appear through the opening.

From the foregoing description, taken in connection with the accompanying drawings, it is at once apparent that a portable station indicator has been provided which may be electrically operated and though of simple construction, is durable in use.

Having thus described the invention, what is claimed as new, is:

1. An indicator having spaced supports, rolls mounted in said supports, gearing connecting the rolls, a drive pinion for the gearing, a driven segment to engage the drive pinion, and means coöperating with the drive pinion and supports to prevent overrunning of the pinion in either direction after the pinion is disengaged by the segment and the said means being lifted into inoperative position by the pinion when the same is engaged by the segment.

2. An indicator having spaced supports, rolls mounted in said supports, gearing connecting the rolls, a drive pinion for the gearing, a driven segment to engage the drive pinion, a dog to engage a notch in one of the supports, a lever to which the dog is pivotally connected, and a link extending from the drive pinion to the lever, the correlation of the link, lever and dog, causing the dog to seat in the notch as the segment leaves the drive pinion.

In testimony whereof I affix my signature.

WILLIAM C. MEADOR.